United States Patent
Moore

(10) Patent No.: US 7,377,200 B2
(45) Date of Patent: May 27, 2008

(54) WORKPIECE HOLDING DEVICES FOR USE WITH SAWS

(76) Inventor: Paul D. Moore, RR #1, Lowbanks, Ontario N0A 1K0 (CA)

( * ) Notice: Subject to any disclaimer, the term of this patent is extended or adjusted under 35 U.S.C. 154(b) by 409 days.

(21) Appl. No.: 11/035,758

(22) Filed: Jan. 14, 2005

(65) Prior Publication Data
US 2005/0172765 A1 Aug. 11, 2005

Related U.S. Application Data

(60) Provisional application No. 60/538,800, filed on Jan. 23, 2004.

(51) Int. Cl.
*B23D 55/04* (2006.01)
(52) U.S. Cl. ............... 83/409; 269/56; 269/240
(58) Field of Classification Search ........... 269/58, 269/95, 56, 60, 65, 240; 83/435.12, 409, 83/435.27; 144/378, 245.3
See application file for complete search history.

(56) References Cited

U.S. PATENT DOCUMENTS

| | | | | |
|---|---|---|---|---|
| 1,582,908 | A | * | 5/1926 | Albert .................. 83/409 |
| 3,071,170 | A | * | 1/1963 | Pease et al. ............. 269/31 |
| 3,782,711 | A | * | 1/1974 | Montgomery ............ 269/31 |
| 3,797,349 | A | * | 3/1974 | Smith ................... 83/404.1 |
| 4,206,673 | A | | 6/1980 | Detjen |
| 4,441,394 | A | * | 4/1984 | Barsotti .................. 83/409 |
| 4,519,283 | A | | 5/1985 | Sanborn |
| 4,559,858 | A | | 12/1985 | Laskowski et al. |
| 4,658,686 | A | | 4/1987 | Woods |
| 4,660,454 | A | | 4/1987 | Elsey |
| 4,732,184 | A | | 3/1988 | Albright |
| 4,741,387 | A | | 5/1988 | Strong |
| 5,038,486 | A | | 8/1991 | Ducate |
| 5,819,613 | A | | 10/1998 | Wilson et al. |
| 5,915,429 | A | | 6/1999 | Pelletier et al. |
| 7,000,519 | B1 | * | 2/2006 | Weinstein et al. ....... 83/435.27 |
| 7,077,043 | B1 | * | 7/2006 | Koerble et al. ............ 83/719 |

* cited by examiner

*Primary Examiner*—Kenneth E. Peterson
(74) *Attorney, Agent, or Firm*—Schwegman, Lundberg & Woessner, P.A.

(57) ABSTRACT

A workpiece holding device comprising a frame having a bottom surface; a clamping device securable to the frame; and an aligning mechanism for aligning the clamping device in a substantially straight line adjacent to a saw is provided. In one embodiment, the aligning mechanism is a miter track securable to the bottom surface of the frame, the miter track adapted to fit within a miter slot located on the table. In one embodiment, the device can also be used as a fence. A conventional saw, such as a stationary and upright band saw can now be converted into a handy and portable sawmill using one of the devices described herein as an accessory, without the need to make any alterations to the saw or saw table. Users can now, for the first time, hold very short (less than about one (1) ft) and small diameter (down to about one (1) inch) logs in the device described herein and slice them into lumber without causing splitting of the log.

18 Claims, 15 Drawing Sheets

# WORKPIECE HOLDING DEVICES FOR USE WITH SAWS

CROSS-REFERENCE TO RELATED APPLICATION

This application claims the benefit under 35 U.S.C. 119 (e) of U.S. Provisional Application No. 60/538,800 filed on Jan. 23, 2004, which is hereby incorporated by reference in its entirety.

FIELD

The present subject matter relates generally to wood cutting, and, more particularly, to wood holders and methods of using same.

BACKGROUND

There are many known devices for slicing logs into lumber. Large commercial saws are generally designed to move the saw through wood rather than the wood through the saw. Such devices depend on the weight of the log as part of the holding device. However, smaller logs lack the weight to function properly with this method. Additionally, cutting shorter and/or smaller diameter logs is particularly difficult because such logs are more difficult to keep properly aligned.

Attempts to solve this problem include attaching a straight edge to the log using fasteners such as screws and nails. The straight edge provides support to the log and can be used against a fence to push the log through a saw. However, such fasteners can significantly damage the wood.

Also, the current ability to cut stacks of boards is limited in that the boards typically have to be placed on edge. As a result, irregularities on the downward-facing edges are hidden, often requiring the boards to be recut. One alternative is the time-consuming process of cutting boards individually.

For the reasons stated above, and for other reasons stated below which will become apparent to those skilled in the art upon reading and understanding the present specification, there is a significant need in the art for systems and methods for improved handling of wood.

SUMMARY

A device comprising a frame having a bottom surface; a clamping device securable to the frame; and means for aligning the clamping device in a substantially straight line adjacent to a saw, the saw connected to a table is provided. In one embodiment, the table has a miter slot and the means for aligning comprises a miter track securable to the bottom surface of the frame, the miter track adapted to fit within the miter slot. In one embodiment, the miter track is securable to the frame in at least two locations. In one embodiment, the means for aligning comprises a fence securable to the table. In one embodiment, the clamping device is adjustable to accommodate differently-sized workpieces. In one embodiment, the frame has a front clamping side and a back fence side and the device can be placed on the table with the back fence side facing the blade for use as a fence. In this embodiment, the miter track can be secured to the frame in at least two locations and to the table in an additional location between the at least two locations. In one embodiment, the saw is a vertical band saw. In one embodiment the workpiece is a log or a stack of wood.

In one embodiment, the invention is a method comprising providing a wood holding device having a substantially horizontal portion connected to a substantially vertical portion, the substantially vertical portion having a front side and a back side; securing a workpiece between the substantially horizontal portion and a jaw located on the front side of the substantially vertical portion; placing the wood holding device on a table with the front side of the substantially vertical portion facing a blade securable to the table; and moving the device forward through the blade wherein the workpiece is cut.

The invention further comprises a method of using a band saw comprising providing a band saw connected to a band saw table; aligning a wood holding device with the band saw; clamping a workpiece to the wood holding device; and moving the wood holding device in a forward direction wherein the workpiece is cut with the band saw. In one embodiment the workpiece is a log. In another embodiment the workpiece is a stack of wood.

A conventional saw, such as a stationary and upright band saw (or table saw), can now be converted into a handy and portable sawmill using one of the devices described herein as an accessory, without the need to make any alterations to the saw or saw table. Users can now, for the first time, hold very short (less than about one (1) ft) and small diameter (down to about one (1) inch) logs in the device of the present invention and slice them into lumber using only this device in combination with a conventional saw without causing splitting of the log.

DETAILED DESCRIPTION

Figure 1:
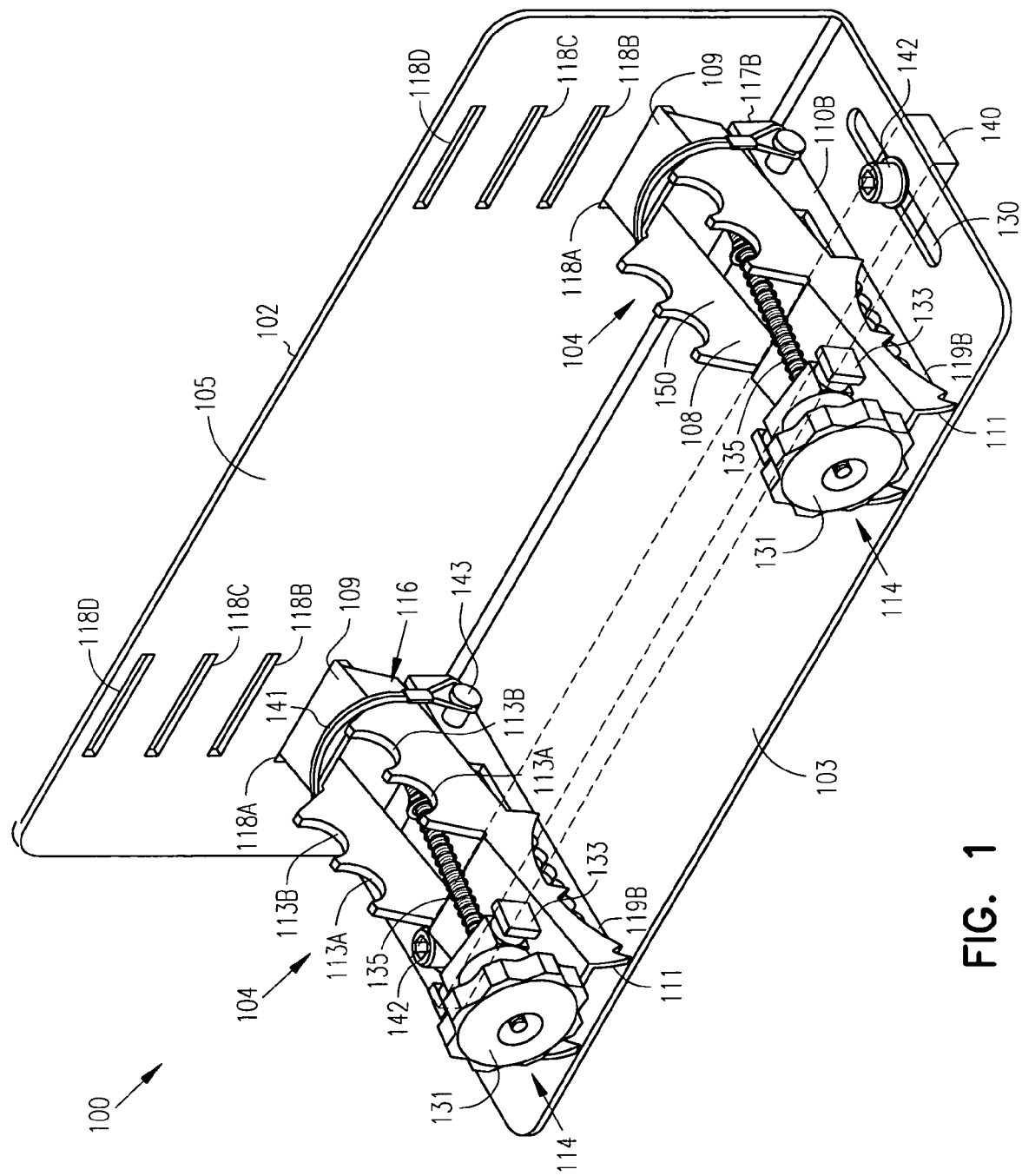
FIG. 1 is a front perspective view of a wood holding device showing two sets of attached jaws in a closed position in one embodiment of the present invention.

In the following detailed description of embodiments of the invention, reference is made to the accompanying drawings that form a part hereof, and in which is shown by way of illustration, specific preferred embodiments in which the subject matter may be practiced. These embodiments are described in sufficient detail to enable those skilled in the art to practice them, and it is to be understood that other embodiments may be utilized and that mechanical, structural, and procedural changes may be made without departing from the spirit and scope of the present subject matter. The following detailed description is, therefore, not to be taken in a limiting sense, and the scope of embodiments of the present invention is defined only by the appended claims, along with the full scope of equivalents to which such claims are entitled.

A wood holding device is disclosed. In the embodiment shown in FIG. 1 the wood holding device 100 is comprised of a frame (i.e., sled) 102 and two sets of jaws or clamps 104. In this embodiment, the frame 102 has a substantially horizontal planar surface ("substantially horizontal portion") 103 contiguous with a substantially vertical planar surface ("substantially vertical portion") 105. In the embodiment shown in FIG. 1, the substantially horizontal portion 103 has two optional outer slots 130 on each end (one shown) and the substantially vertical portion 105 has two series of upper jaw slots (118A, 118B, 118C and 118D). The two outer slots 130 are used to secure a miter track 140 located beneath the substantially horizontal portion 103 of the frame 102 with suitable securing means 142, such as the bolt, nut and washer shown in FIG. 1. In other embodiments, no miter track 140 is used and the device 100 is placed against an existing fence on a band saw table and used as described herein. This arrangement is useful in embodiments in which no miter slot is available. In such embodiments, the device 100 can be provided with no slots 130, miter track 140 or securing means 142, although such components provide added flexibility to the user, allowing the device 100 to be used with virtually any type of band saw.

Figure 4A:
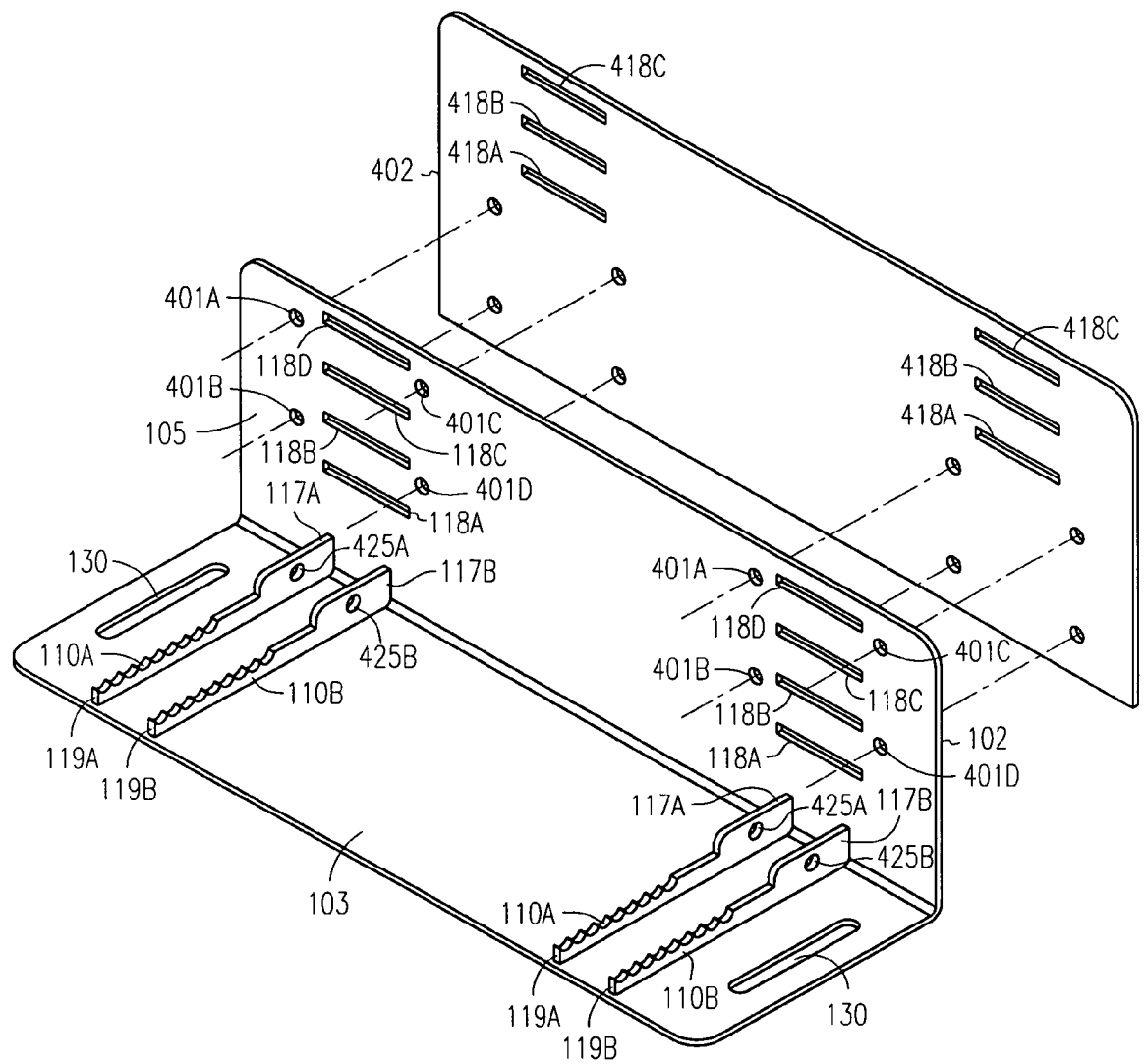
FIG. 4A is a front perspective view of a frame portion of the wood holding device shown in FIG. 1 having two pairs of lower jaw elements secured thereto, together with an optional height extender in one embodiment of the present invention.

Referring to both FIGS. 1 and 4A, each set of jaws 104 is comprised of an upper jaw 108 and a pair of lower jaw elements 110A and 110B (with only one lower jaw element 110B visible in FIG. 1). Each upper jaw 108 further has a first end 109 and a second end 111, and further includes two sets of locking block groove pairs, i.e., a first locking block groove pair 113A and a second locking block groove pair 113B, although the invention is not so limited. Each pair of lower jaw elements 110A and 110B also have first ends, 117A and 117B, respectively, and second ends, 119A and 119B, respectively, as shown most clearly in FIG. 4A. In an alternative embodiment, only upper jaws 108 or only lower jaw elements 110A and 110B are used. Each first end 109 of the upper jaws 108 in this embodiment is securable to the frame 102 with a connecting pin 202 (shown in FIG. 2) and is locked into place during use with a locking mechanism 114. In the embodiment shown in FIG. 1, each locking mechanism 114 comprises a knob 131 adjacent to a locking block 133 and a shaft 135. During use, the locking block 133 can be positioned in either the first locking block groove pair 113A or the second locking block groove pair 113B of its respective upper jaw 108, depending on the size of the workpiece. Each shaft 135 extends down through an opening 150 in its respective upper jaw 108. The shaft 135 is securable in place near its lower end with a locking pin 116 which comprises a U-shaped portion 141 and a rod 143. The rod 143 threads through openings (425A and 425B) located near the first ends 117A and 117B of the lower jaw elements 110A and 110B, thus forming a D-shaped pin when closed.

Referring again to both FIGS. 1 and 4A, the set of jaws 104 in this embodiment are shown in a "closed" position with the second end 111 of each upper jaw 108 contacting the second end 119A and 119B of each of the lower jaw elements 110A and 110B, respectively. (This is in contrast to an "open" position in which the second end 111 of each upper jaw 108 is not in contact with the second ends 119A and 119B of the lower jaw elements 110A and 110B, respectively). In the embodiment shown in FIG. 1, the upper jaw 108 and lower jaw elements 110A and 110B are arranged so that the lower jaw elements 110A and 110B fit inside the upper jaw 108. By not aligning the teeth of the upper jaw 108 directly over the teeth of the lower jaw elements 110A and 110B in this manner, a sheering action results, allowing a more secure "bite" on the workpiece, with less chance of a round workpiece, such as a log, rolling or sliding within the set of jaws 104.

An "open" position can occur when a workpiece is placed between the set of jaws 104, changing it from a "closed" position to an "open" position, or it can occur when the first end 109 of the upper jaw 108 is securable to the frame 102 in such a manner so as to cause the set of jaws 104 to be in an "open" position, regardless of whether a workpiece is present or not. The first ends 109 of each upper jaw 108 can be secured at any suitable height along the substantially vertical portion 105 of the frame 102, thus providing alternative pivot points. In one embodiment, a single opening, designed to hold the first end 109 of a single upper jaw 108 at varying heights is provided and any suitable securing means is used to secure the first end 109 to the substantially vertical portion 105. Such an opening may be notched or otherwise designed to allow the first end 109 of each upper jaw 108 to be placed at any desired height.

In the embodiment shown in FIG. 1, two sets of upper jaw slots (118A-118D) is provided for this purpose, thus providing alternative positions for each upper jaw 108. It should be apparent to those skilled in the art that any number of upper jaw slots can be used, although four are shown in FIG. 1. Such flexibility can be important when cutting materials of differing dimensions. For example, when cutting a smaller diameter log, it may be advantageous to have the first ends 109 of each upper jaw 108 secured to the lowest slot, e.g., 118A. When cutting a larger log, it may be advantageous to have the first ends 109 of each upper jaw 108 secured to one of the upper slots, e.g., 118C or 118D. Typically each first end 109 will be secured at about the same height as any other first ends 109 present, although the invention is not so limited. In one embodiment the workpiece has a varying height and the first ends 109 are secured at different heights on the substantially vertical portion 105. In one embodiment the upper jaw slots 118A-118D are designed to allow the first end 109 of each upper jaw 108 to pivot slightly in order to get both rows of teeth properly secured to the workpiece.

In this embodiment, the first end 109 of each upper jaw 108 is shown extending through upper jaw slot 118A and there is no workpiece present, allowing the set of jaws 104 to be closed. The "closed" position is the position the device 100 is likely to be shipped in originally and/or stored between, although the invention is not so limited. The set of jaws 104 can also be shipped and/or stored in an open position (e.g., with the first end 109 of each upper jaw 108 in upper jaw slot 118B, for example). However, the lowermost upper jaw slot, 118A, is also useful when a smaller workpiece (not shown) needs to be cut, as the workpiece can be clamped between the set of jaws 104, causing the upper jaw 108 to raise up, thus placing the set of jaws 104 in an open position. Other upper jaw slots, 118B, 118C or 118D can be used as needed, depending on the size of the workpiece (not shown) to be cut. The more elevated the upper jaw slot (118C, 118D) used, the larger the workpiece that can be accommodated as the first end 109 of the upper jaw 108 is therefore located in a more elevated position.

In this embodiment, the upper jaw 108 has a double row of teeth although the invention is not so limited. However, by having more than one row of teeth, the upper jaw 108 can more easily grasp a workpiece. The precise orientation and size of the teeth is not important as long as an adequate grip can be maintained.

Figure 2:
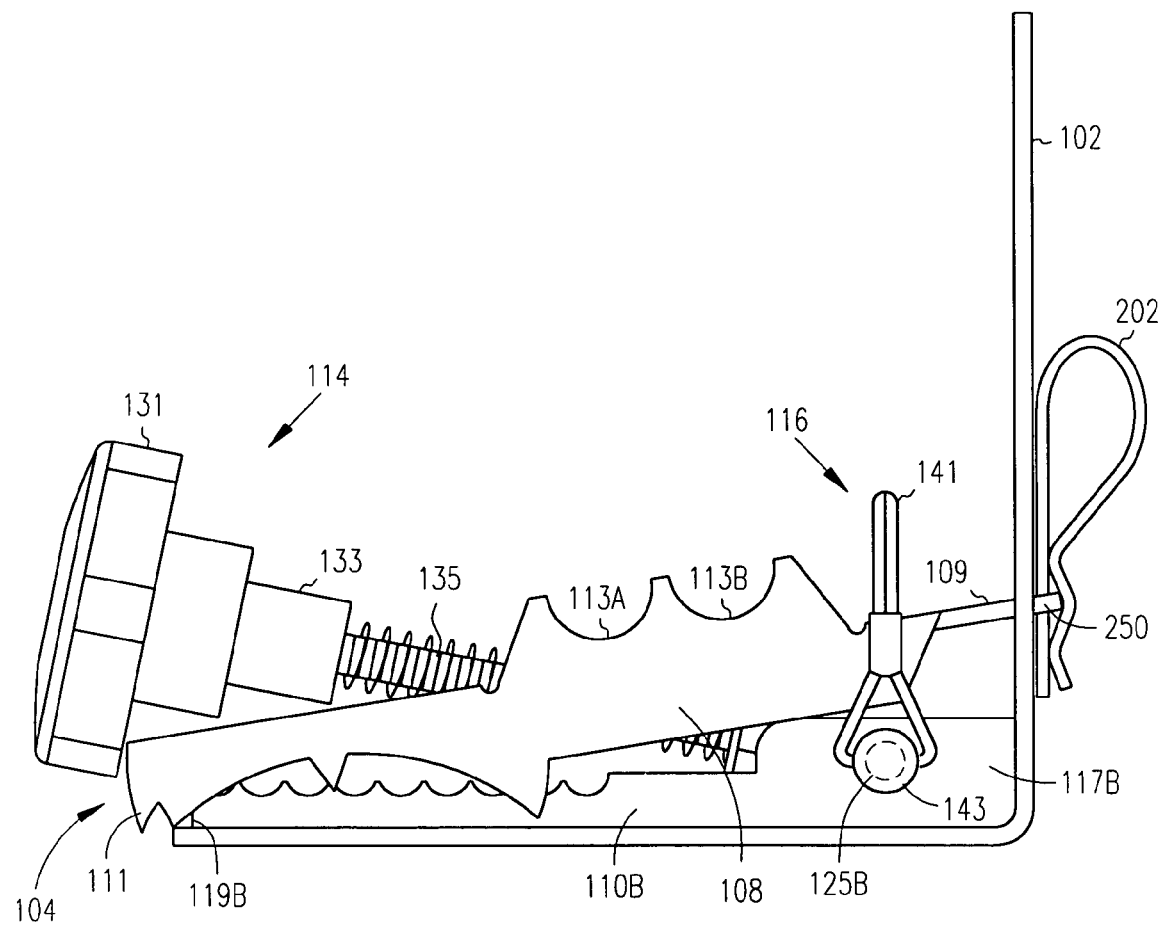
FIG. 2 is a side view of the wood holding device shown in FIG. 1 in one embodiment of the present invention.

FIG. 2 provides an end view of the wood holding device 100, in which only one set of jaws 104 can be seen. In this embodiment, the set of jaws 104 is again in the closed position as the second end 111 of the upper jaw 108 is in contact with the second ends 119A and 119B (only 119B shown) of both of the lower jaw elements 110A and 110B (only 110B shown). In this embodiment, the upper jaw 108 also has a rear tab 250, although the invention is not so limited. The rear tab 250 is designed to fit through one of the slots (118A-118D) located in the substantially vertical portion 105 of the frame 102. The rear tab 250 further comprises a rear tab opening (not shown) through which the connecting pin 202, such as the clevis pin shown, can be inserted to secure the first end 109 of the upper jaw 108 to the substantially vertical portion 105 of the frame 102. (See rear tab opening 504 in FIG. 5A). In other embodiments there is no rear tab 250 and the first end 109 of the upper jaw 108 is secured in any suitable way to the substantially vertical portion 105.

Figure 3A:
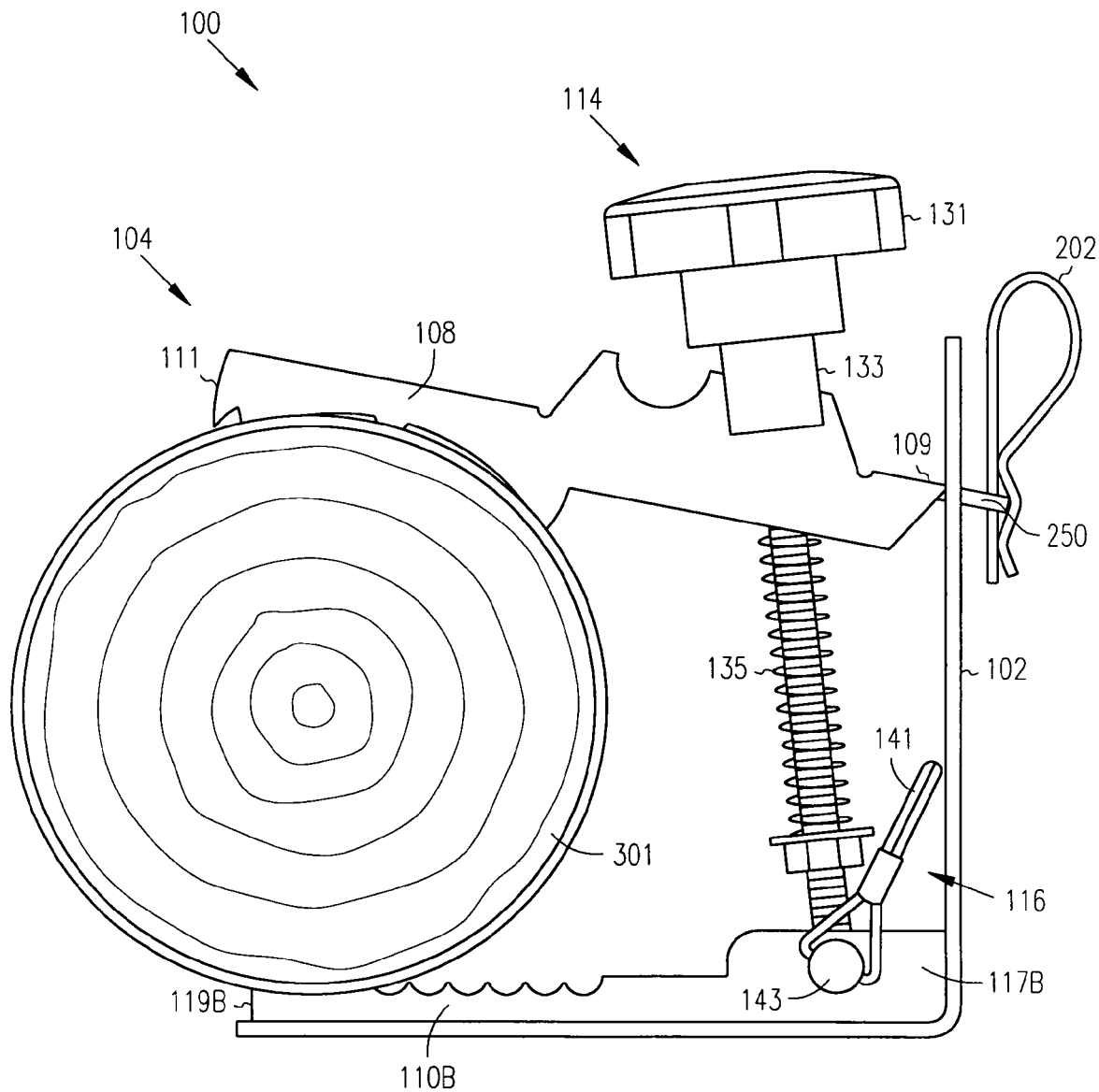
FIG. 3A is a side view of the wood holding device of FIG. 2 showing one set of attached jaws gripping a log in one embodiment of the present invention.

FIG. 3A shows the jaws 104 in an open or gripping position, with a log 301 secured therebetween. In one embodiment, as shown in FIG. 1, there are two sets of jaws 104 and the log 301 is secured between both sets of jaws 104. (See FIG. 8A). Use of more than one set of jaws 104 reduces the chance of the workpiece moving or pivoting while being cut. In most embodiments, two sets of jaws 104 are sufficient, although the invention is not so limited. In another embodiment, there are three sets of jaws 104 and the log 301 is secured between all three sets of jaws 104. In yet another embodiment, there are more than three sets of jaws 104 and the log 301 is secured between all sets of jaws 104.

The device 100 can be designed to accommodate workpieces (e.g., logs, stacks of wood, etc.) of varying sizes and dimensions. In one embodiment, a workpiece such as a log having a diameter down to about one (1) inch and a length of about four (4) inches can be cut. In other embodiments, a workpiece having a diameter greater than about one (1) inch up to about 12 inches, and a length greater than about four (4) in up to about four (4) ft. In other embodiments, workpieces even larger than 12 inches in diameter and longer than about four (4) ft can be cut as long as the device 100 is designed with a suitably large frame and can securely clamp the workpiece between one or more sets of clamps or jaws.

Figure 3B:
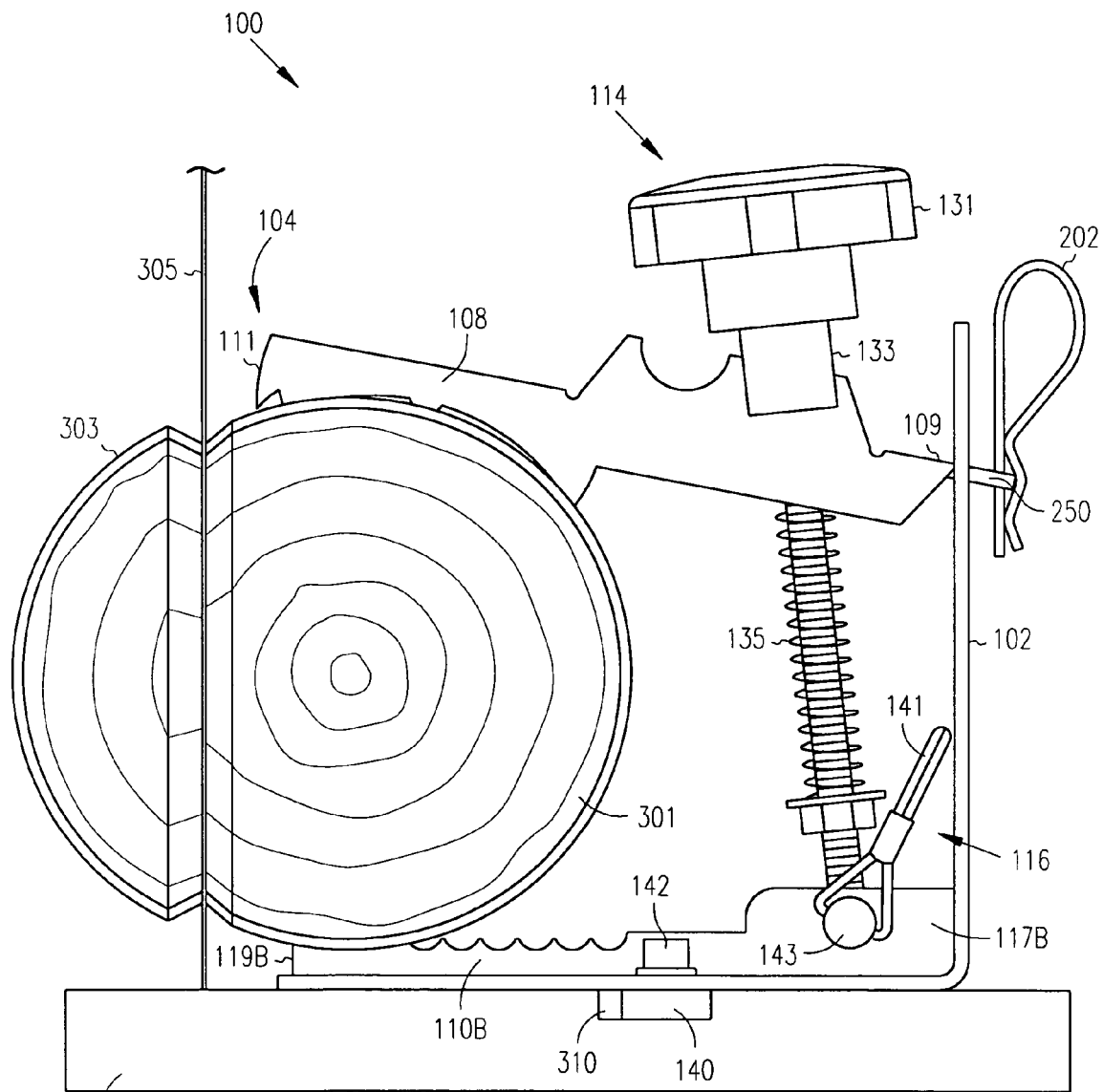
FIG. 3B is a side view of the wood holding device of FIG. 2 in use with a band saw, showing one set of attached jaws gripping a partially cut log in one embodiment of the present invention.

FIG. 3B shows the device 100 in place on a band saw table 307 having a band saw 305 with the jaws 104 in an open or gripping position and a partially cut log 303 secured therebetween. Again, there can be two, three or more sets of jaws 104 between which the partially cut log 303 can be secured.

Figure 3C:
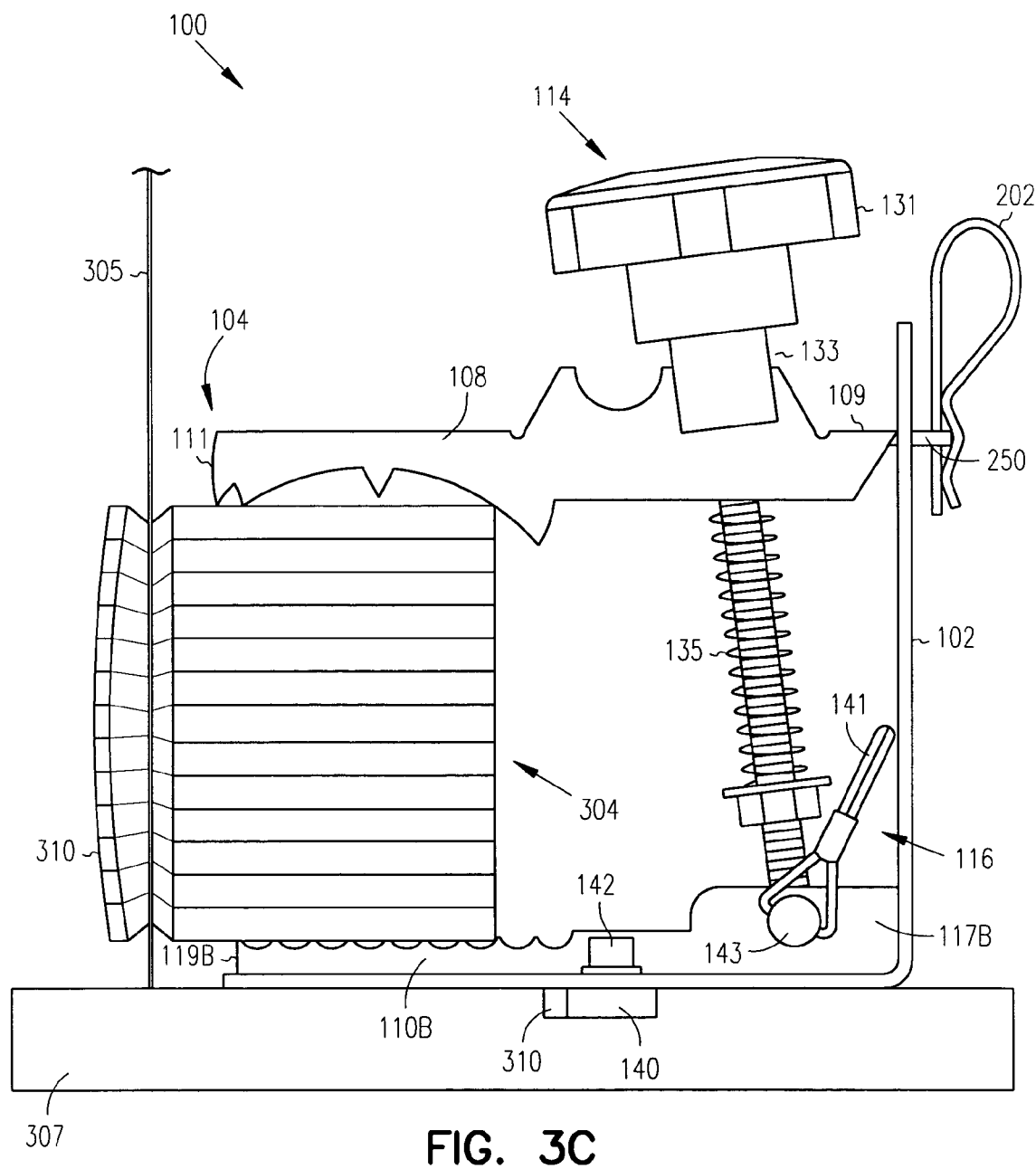
FIG. 3C is a side view of the wood holding device of FIG. 2 in use with a band saw, showing one set of attached jaws gripping a stack of boards in one embodiment of the present invention.

FIG. 3C shows the device 100 in place on a band saw table 307 having a band saw 305 jaws 104 in an open or gripping position and a stack of boards 304 secured therebetween, with the wane edges 310 being removed. With the boards 304 positioned in this manner it is very easy to see if the boards 304 are going to be cut straight, as desired. Again, there can be two, three or more sets of jaws 104 between which the partially cut log 303 can be secured. The novel design of the device 100 allows, for the first time, a stack of boards 304 to be cut together while lying flat, rather than cutting only one board or positioning a stack of boards on edge to be cut. A user need only reposition the set of jaws 106 while the device 100 is still aligned with the band saw 305, to change from cutting one type of workpiece, such as a log, to a stack of boards as shown.

Referring again to FIG. 4A, any number of lower jaw elements 110A and 110B having any suitable shape and size can be secured to the frame 102 in any suitable manner. In one embodiment, the lower jaw elements 110A and 110B are welded to the frame 102. In one embodiment, the lower jaw elements 110A and 110B are welded at the bend or intersection between the substantially horizontal portion 103 and the substantially vertical portion 105, serving essentially as a gusset bracket at the bend. The precise shape of the teeth in the lower jaw elements 110A and 110B can vary, although it is preferable that the teeth are designed to securely grip the workpiece. In one embodiment, each tooth has a sharp point as shown and are joined together to form a series teeth and minimally-deep valleys that have a wide "U" shape. This is in contrast with V-shaped teeth and valley combinations found in conventional jaws, although the invention is not so limited as any suitable configuration of teeth and valleys can be used. A wide "U"-shaped configuration, however, provides an improved grip and minimizes damage to the workpiece. In a particular embodiment, the distance between tips (point-to-point) is between about ¼ and ¾ inch and the height of the tip, i.e., distance between lowest point in valley and highest point of tip is between about ⅛ and ¾ inch. The valley itself can be any suitable height off the frame 102 such as between about ⅛ and ¾ in, such that the overall height of the tip (measured from the surface of the frame 102) is between about ¼ and 1½ inches.

In an alternative embodiment, the lower jaw elements 110A and 110B are replaced with a series of holders, such as screws extending up from the substantially horizontal portion. In other embodiments, each pair of lower jaw elements 110A and 110B is combined into a single separate component that is secured to the frame 102 in any suitable manner. In yet other embodiments, there are no lower jaw elements 110A and 110B present. However, the use of at least some type of lower jaw element is preferred to keep the workpiece up off whatever flat surface it has been placed. In this way, some clearance is provided from the horizontal surface (whether it be the band saw table itself or the top surface of the substantially horizontal portion 103 of the frame 102), so that the workpiece can be gripped by the teeth of the lower jaw elements and does not rock on the flat surface of the frame 102. This is particularly advantageous for workpieces which are irregular in shape, such as a log having a rounded shape and irregular surface that may contain bumps. Furthermore, the use of at least two rows of lower jaw elements, 110A and 110B, is also preferred as it provides two sets of contact points for the bottom side of the workpiece, thus preventing the workpiece from pivoting, which may occur with a single row of teeth. In this way, sufficient stability is provided for any type and configuration of workpiece, including a log which is twisted rather than substantially straight. In one embodiment, the two rows of lower jaw elements 110A and 110B are about 8 to 10 inches apart. In another embodiment, the two rows are less than 8 inches apart, down to about four (4) inches apart. If the rows are placed too close together the benefit provided in having two rows is minimized as the workpiece may still pivot. In another embodiment, the two rows are more than 10 inches apart, up to about 20 inches or more, although such spacing is more useful with larger logs, such as those having a diameter in excess of about six (6) inches.

Figure 8A:
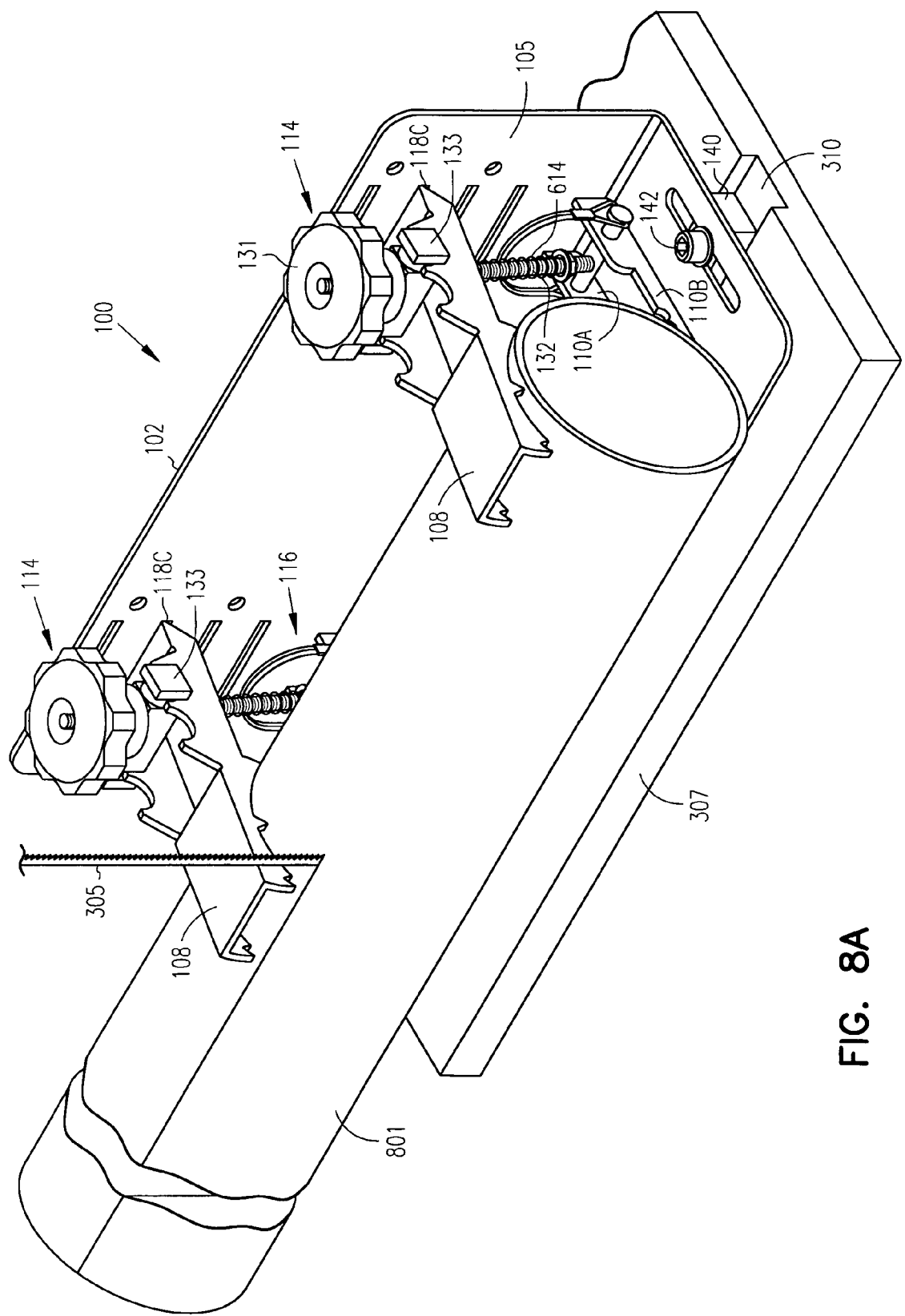
FIG. 8A is a perspective view of the wood holding device showing the attached jaws in the open position in use as a wood holder, with a band saw in one embodiment of the present invention.

The outer slots 130 on the frame are used for positioning the device 100 within the miter track 140 on a band saw table (See FIG. 8A). In this way, the frame 102 can be properly positioned to a variety of miter slots regardless of their shape, position and size. This arrangement further allows adjustments to be made to accommodate different shapes and diameters of workpieces, such as logs, as well as different types of band saw tables which can have different types and locations of miter slots. The outer slots 130 also allow the frame 102 to be positioned at any angle on a band saw table while still allowing a substantially vertically-oriented blade to cut substantially vertically. In one embodiment, there is only one outer slot 130 on one end or the other. In other embodiments, there are no outer slots 130 and the device 100 is positioned on the table using other means known in the art, such as against an existing fence.

The outer slots 130 can be located any suitable distance in from the edge of the horizontal portion 103 of the frame 102 as long as they can securely fasten the miter track 140 to the device 102. In one embodiment, the outer slots 130 are located at a distance from each edge that is about five (5) to 20% of the total length of the horizontal portion 103, although the invention is not so limited. In one embodiment, that distance is about 9 to 13% of the total length of the horizontal portion 103. In one embodiment, the distance is about 11%. In a particular embodiment, the horizontal portion 103 has a length of about 14 inches and the outermost edge of each slot 130 is located about 1.5 inches from each edge of the horizontal portion 103. The outer slots 130 can be any suitable size and shape, such as rectangular, oblong, curved (e.g., in an arc) and so forth. In one embodiment, each slot 130 has an oblong shape which is about four (4) to eight (8) inches in length and about ¼ to one (1) inch in width. In a particular embodiment, each slot 130 is about five (5) to six (6) inches in length and about ⅜ to ½ inch in width.

The miter track 140 can also be any suitable size, as long as the miter track 140 is sufficiently long to provide a secure fit to the device 100, and in most embodiments is about the same length as the frame 102, although the invention is not so limited. In one embodiment, the miter track 140 is longer than the device, up to one (1) inch or more, depending on the length of the device 100, making it easier to align the miter track 140 (with the miter slot 310 in the table 307, See FIG. 8A). In one embodiment, the miter track 140 is about ⅜ to one (1) inch in width and about 14 inches to six (6) feet in length, again depending on the size of the device 100. The miter track 140 is essentially designed to fit into a conventional groove in a band saw table. Such a groove typically has a width of about ⅜ inch to one (1) inch, a depth of about ⅛ to ¾ inch and a length anywhere from about ten (10) inches up to ten (10) feet or more.

Any suitable type of material can optionally be added to the bottom of the frame 102 to decrease friction so that the device 100 slides more easily on a band saw table. The use of such a component also helps to reduce or prevent scratching on table surfaces, such as a cast iron surface. In one embodiment, one or more strips of tape (not shown), such as nylon tape, are used for this purpose. The tape can have any suitable thickness and in one embodiment has a thickness of about 1/16 inch.

The frame 102 can also optionally have holes located in the substantially vertical portion 105, such as two sets of four holes (401A-401D), to which a height extender 402 can be secured using corresponding holes located in the height extender 402 as shown in FIG. 4A. The height extender 402 can contain additional slots such as 418A, 418B and 418C, as shown, to accommodate the upper jaw 108. In this way the upper jaw 108 can be secured even higher for use with larger logs.

Figure 4B:
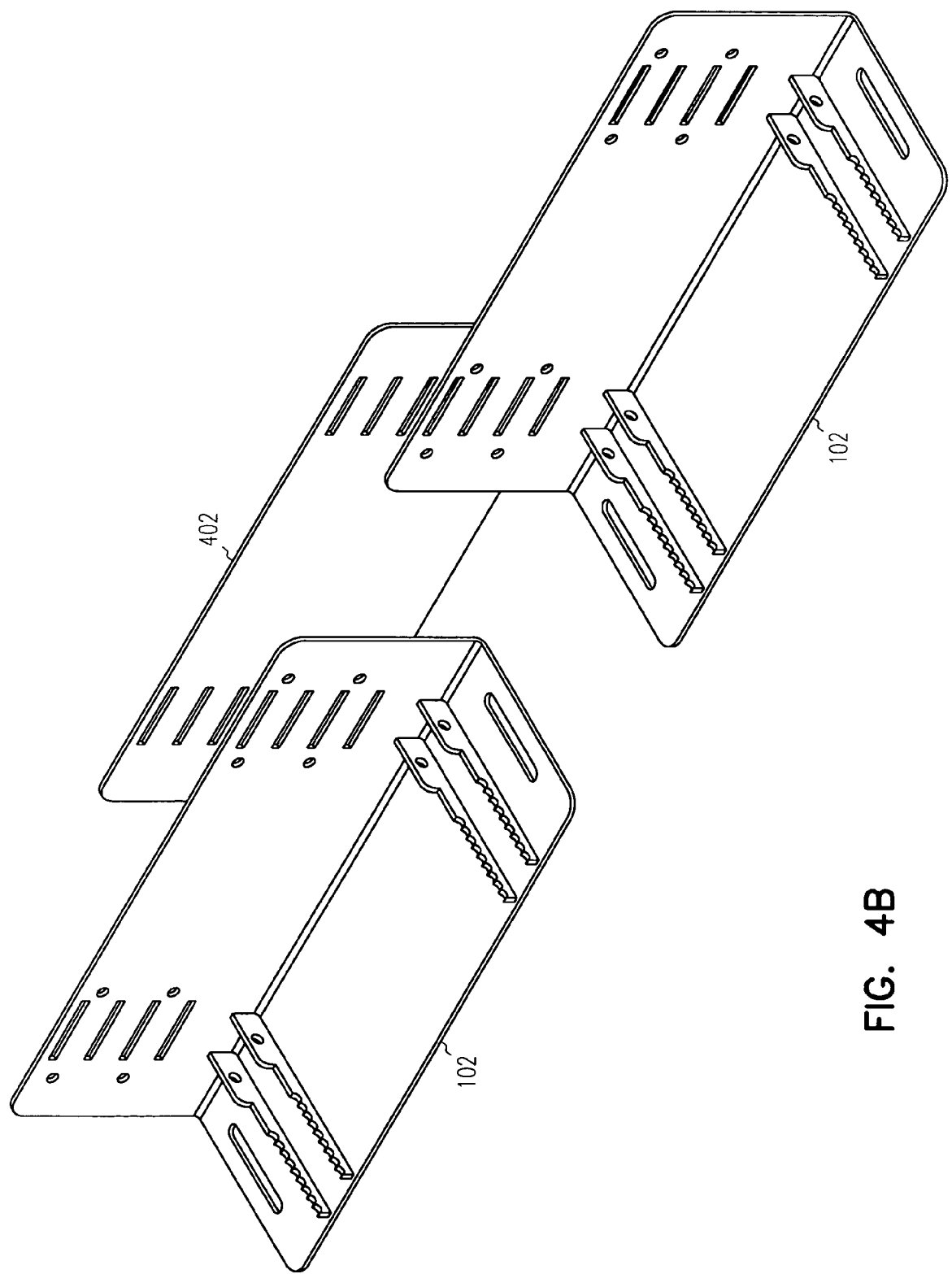
FIG. 4B is a front perspective view of two frame portions connected together with a height extender in one embodiment of the present invention.

The frame 102 can also be any suitable size any shape as long as it can perform the intended function. In one embodiment, the frame 102 is about six (6) inches wide, about 14 inches in total length and about 6 inches in height, although the invention is not so limited. In some embodiments, it may be desirable to use a larger frame that is about four (4) to five (5) feet in length and/or about 10 to 12 inches in height. In an alternative embodiment, the height extender 402 described above can be used to temporarily give the additional height required, thus providing even more flexibility. In one embodiment, the height extender is used to join two devices together using one set of holes in each device as shown in FIG. 4B. Such embodiments are useful for longer and/or larger diameter logs. Preferably multiple sets of jaws 104, such as three or more are used in such embodiments to prevent pivoting of the log being cut.

The frame 102 can further be of any suitable thickness, such as about ⅛ inch to about 1¼ inches. The frame 102 can be made from any suitable material. In one embodiment any type of magnetic metal or metal alloy (e.g., steels) can be used. In one embodiment the frame 102 is made from hardened steel and has a thickness of about ⅛ to 1.5 inches. In another embodiment, other materials can be used, such as any type of plastic (e.g., nylon, polyethene, polystyrene, and so forth), any type of nonmagnetic metal alloy (e.g., aluminum, aluminum alloys), and so forth. In one embodiment 1313-T5 aluminum alloy is used. In another embodiment, a glass-filled, type 66 nylon is used. Use of a plastic frame 102 may provide a more rigid device as compared with certain types of conventional aluminum devices, but may not be as economical as steel. However, use of a nylon material does provide the advantage of creating less friction, as compared with various metals, eliminating the need for any type of added material to the underside to reduce friction. However, use of materials other than steel will likely require a greater thickness to provide the requisite strength such as between about ¼ and 1½ inches for plastic and about ⅛ and ⅜ inches for aluminum.

The frame 102 can be made by any suitable manufacturing methods. In one embodiment, the frame 102 is one piece of steel material formed into the proper shape by bending using tools known in the art, such as a metal brake or metal press, to create the substantially horizontal and vertical portions, 103 and 105, respectively. In other embodiments the substantially horizontal and vertical portions, 103 and 105, respectively are two separate pieces of materials joined together by any suitable means, such as welding. In yet other embodiments the components of the device 100 are made by using any suitable process, such as extrusion, injection molding, casting, and so forth. When produced in a die with an extrusion process, material-savings techniques can also be used, including forming openings. Furthermore, if the openings are made substantially symmetrical, material flows through the die more easily and uniformly. The openings do not need to be of any particular shape or size or located in any particular area, as long as the device 100 is structurally sound and has dimensional stability. Such openings also help the resulting extrudate cool faster. In one embodiment, the frame 102 and each opening is laser-cut. Laser cutting is a method of cutting metal known in the art that does not distort the shape or integrity of the metal (due to minimal heat requirements) and further provides a smooth surface for finishing.

Figure 5A:
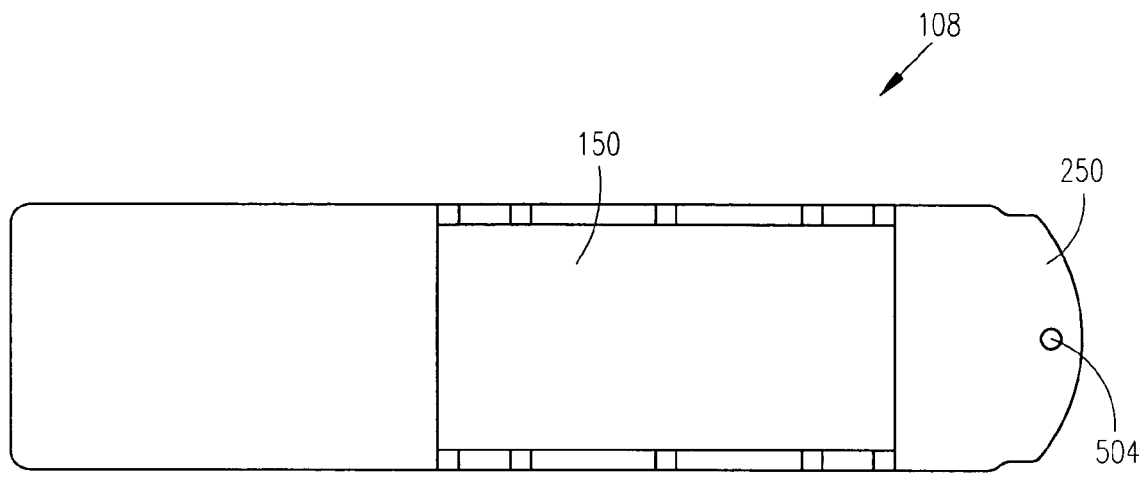
FIG. 5A is a top view of an upper jaw portion of the wood holding device shown in FIG. 1 in one embodiment of the present invention.
Figure 5B:
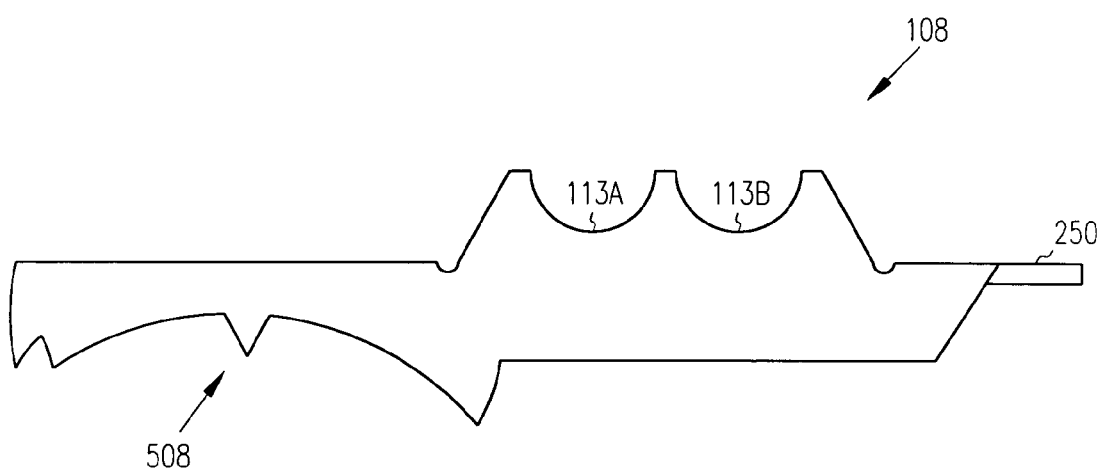
FIG. 5B is a side view of the upper jaw shown in FIG. 5A in one embodiment of the present invention.

Referring now to FIGS. 5A and 5B, top and side views of the upper jaw 108, respectively, are provided. Again, any suitable design can be used for the upper jaw 108 as long as it can perform the intended function. The large central opening 150 is provided in this embodiment to provide for easy removal of the upper jaw 108 from the device 100 as needed (such as when the device is to be used as a fence only). (See FIGS. 9A and 10). The central opening 150 can be any suitable size and shape as desired as long as the upper jaw 108 maintains sufficient strength, but in this embodiment is a rectangular opening about one-half the length of the upper jaw 108 and nearly the same width.

In the embodiments shown herein, including in FIG. 5B, there are two locking block groove pairs, 113A and 113B, as discussed above, although the invention is not so limited. In one embodiment, there is only one locking block groove pair. However, use of more than one groove for the locking mechanism 114 provides added flexibility to be able to cut workpieces, such as logs, of different widths or diameters. For larger workpieces, locking mechanism groove pair 113B is used. For smaller workpieces, locking block groove pair 113A is used. In other embodiments there are more than two locking block groove pairs.

FIG. 5B also shows one particular design for a row of teeth 508 although, again, the invention is not so limited. The teeth of the upper jaw 108 can begin anywhere along the length of the upper jaw 108. In one embodiment, the teeth start near the rear tab 250. However, by having the teeth start about half-way along the length of the upper jaw 108 rather than more towards the back edge, the upper jaw 108 is better able to grasp the workpiece in square, at closer to a 90 degree angle. In some embodiments, the teeth start even further away from the rear tab 250 and in other embodiments the teeth start at a point less than one-half the length of the upper jaw 108, but again, are preferably in a location to promote gripping of the workpiece at a substantially 90 degree angle to the workpiece.

The upper jaw 108 can be made from any suitable material as long as it is capable of performing the intended function. In one embodiment the upper jaw 108 is made from the same material as the frame (102) and lower set of teeth (110A and 110B). The upper jaw 108 can be any suitable size and shape and in one embodiment is about four (4) to 16 inches in length and about ½ to four (4) inches in width. In most embodiments, however, the upper jaw 108 is between about five (5) and eight (8) inches in length and between about one (1) and two (2) inches in width.

Figure 6:
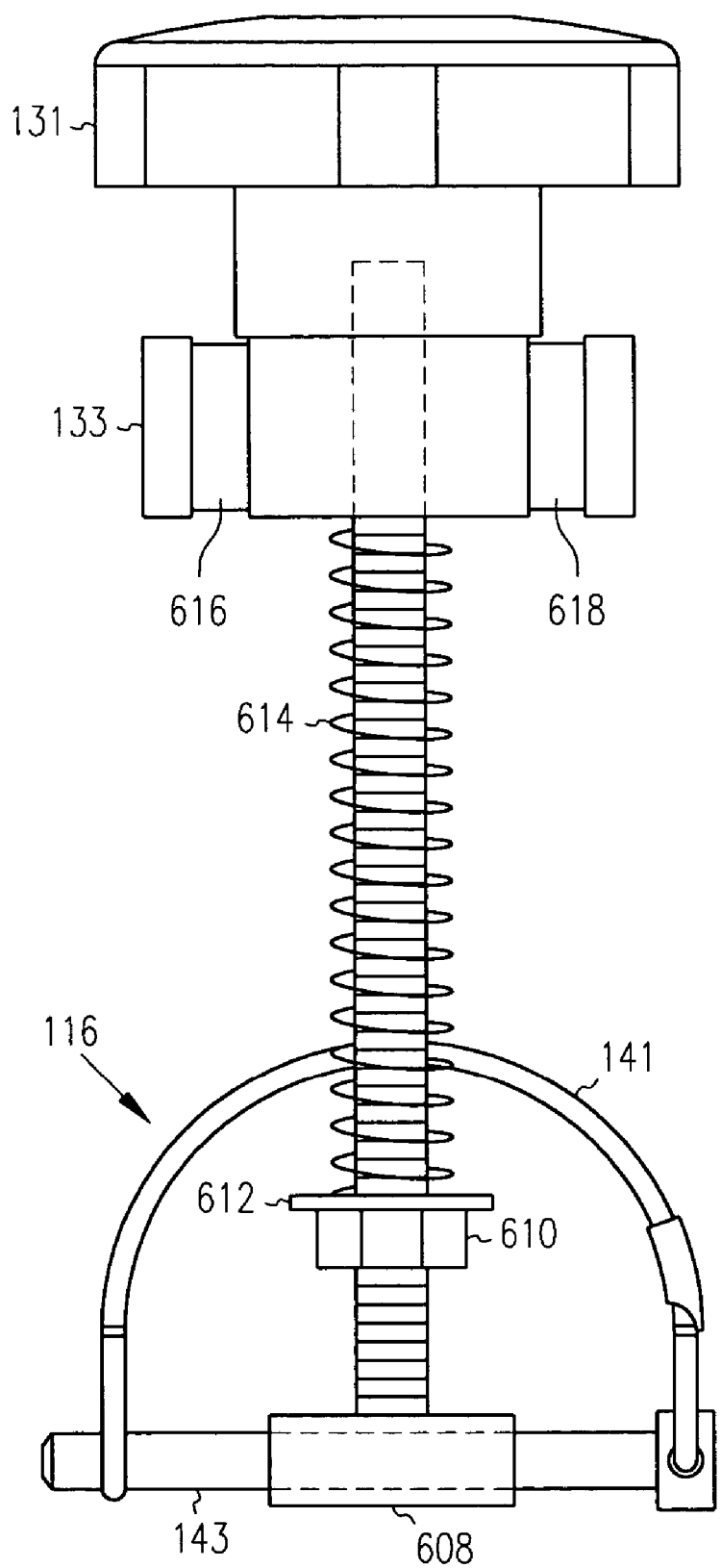
FIG. 6 is a front view of a locking mechanism portion of the wood holding device shown in FIG. 1 connected to a locking pin in one embodiment of the present invention.

In the embodiment shown in FIG. 6, the locking mechanism 114 is comprised of the knob 131 and locking block 133 on one end and the pivot tube 608 on the other end, with the shaft 135 in between. More specifically, the shaft 135 runs though the locking block 133 and up through the knob 131 on one end and down to the pivot tube 608 on the opposing end, after passing though a nut 610 and washer 612. In one embodiment, the shaft 135 and pivot tube 608 are welded together. In another embodiment, the pivot tube 608 contains a small opening into which the shaft 135 extends. The shaft 135 is surrounded by a spring 614, which is located between the locking block 133 and the washer 612. The spring 614 serves to hold the locking block 133 in position during use. The locking block 133 is preferably flat on the top to fit tightly against the knob 131 and flat on the bottom to allow the spring 614 to contact a flat surface. The locking block 133 is preferably shaped to fit into a locking block groove pair (i.e., either 113A or 113B) of the upper jaw 108. In one embodiment the locking block 133 is machined with two grooves 616 and 618 (as shown in FIG. 6) to slip into a locking block groove pair (113A or 113B). In this way, the locking block 133 is easily aligned with the top of the upper jaw 108 and further stays in a fixed position during use, not sliding from side to side.

In one embodiment the shaft 135 is threaded and as the knob 131 is tightened, the locking block 133 is forced in an upwardly direction by the spring 614. The nut 610 and washer 612 are used to adjust the tension on the spring 614 as desired to provide a sufficient amount of tension to lift the locking block 133 out of the way, thus allowing the upper jaw 108 to raise the desired amount. In one embodiment, about ⅛ to ½ lb of pressure or tension is applied to the spring. The locking block 133 can be made with any suitable material, such as plastics, metals, and so forth. In one embodiment it is made with aluminum or aluminum alloys. Tightening the knob 131 also causes the upper jaw 108 to increase its grip or "bite" (with substantially even pressure) on a workpiece (not shown), together with the lower jaw elements (110A and 110B). (See FIG. 3A, for example).

The locking mechanism 114 can be any suitable size and shape. In one embodiment, the shaft 135 is about two (2) to 20 inches in length and about ⅛ to one (1) inch in diameter, although in some embodiments, the shaft 135 can be even larger. In most embodiments, the shaft is about six (6) to eight (8) inches in length and about ¼ to ⅜ inches in diameter. Any suitable type of spring 614 can be used to provide tension. In one embodiment, the spring is a spring wire having a thickness of about 0.032 inches, an outer diameter of about ½ inch and a length of about 2.5 inches, although any suitably sized spring can be used, and in some embodiments the spring 614 is up to six (6) inches or more in length. In other embodiments, tension is provided using any suitable means known in the art. In one embodiment tension is provided using any type of cylinder, such as a hydraulic cylinder or air cylinder. In another embodiment tension is provided using an over-center lever style clamp.

Figure 7:
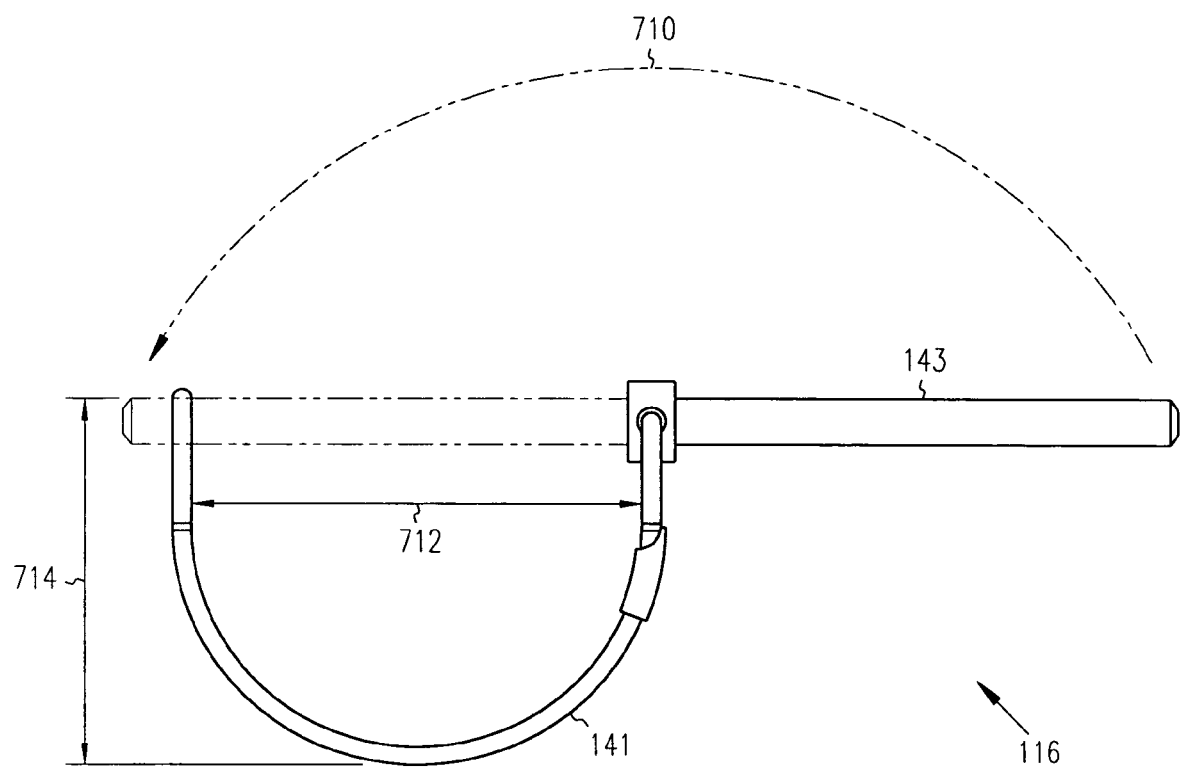
FIG. 7 is a front view of the locking pin shown in FIG. 6 in one embodiment of the present invention.

Referring now to FIG. 7, the locking pin 116 has a U-shaped portion 141 and a rod 143 connected thereto. The locking pin 116 is shown in an open position in FIG. 7, with the arrow 710 indicating the direction the rod 143 is moved to put the locking pin 116 in a closed position. The locking pin 116 can be any suitable size as is needed to properly secure the locking mechanism 114 to the lower jaw elements (110A and 110B). In one embodiment, the rod 143 is about one (1) to three (3) inches in length and about ⅛ to ½ inches in diameter. In one embodiment, Distances 712 and 714 are about 1.5 to three (3) inches. In one embodiment, these distances are about two (2) inches.

FIG. 8A shows the device 100 on a band saw table 307. In this embodiment, the blade 305 is shown slicing through a workpiece 801, which in this case is a log, to make a straight and flat side. The miter track 140 is secured to the device 100, which is then placed in the miter slot 310 in the table 207. Prior to being secured, the device 100 can be slid back and forth on top of the miter track 140 and secured only when the desired position is met. In one embodiment, the miter track 140 is already in the miter slot 130 prior the device 100 being placed on top of it and secured. As can be seen, the device 100 is positioned so as to not interfere with the blade 305. In this embodiment, the workpiece 801 is longer than the device 100 although the invention is not so limited. Longer or shorter workpieces can be clamped and cut as desired. As noted above, the locking mechanism 114 is tightened down sufficiently so an adequate amount of pressure is placed on the upper jaw 108 to keep a secure grip on the workpiece 801, together with the lower jaw elements 110A and 110B. Although the workpiece 801 shown here is a log, a user need only reposition the set of jaws 106 while the unit is still in place on the band saw table 307 to change from cutting one type of workpiece 801, such as a log, to another, such as a stack of boards. The slot 130 allows the unit to be placed as close to the blade 305 as desired, as the miter track 140 can be secured at any location along the length of the slot 130. In this way, the workpiece can be sawed and re-sawed into any thickness, depending on where within the slots 130 the miter track 140 is secured. In one embodiment, the miter track 140 is secured at an angle to the device 140, causing the frame 102, and hence the workpiece (e.g., 801) to be at an angle to the blade.

Figure 8B:
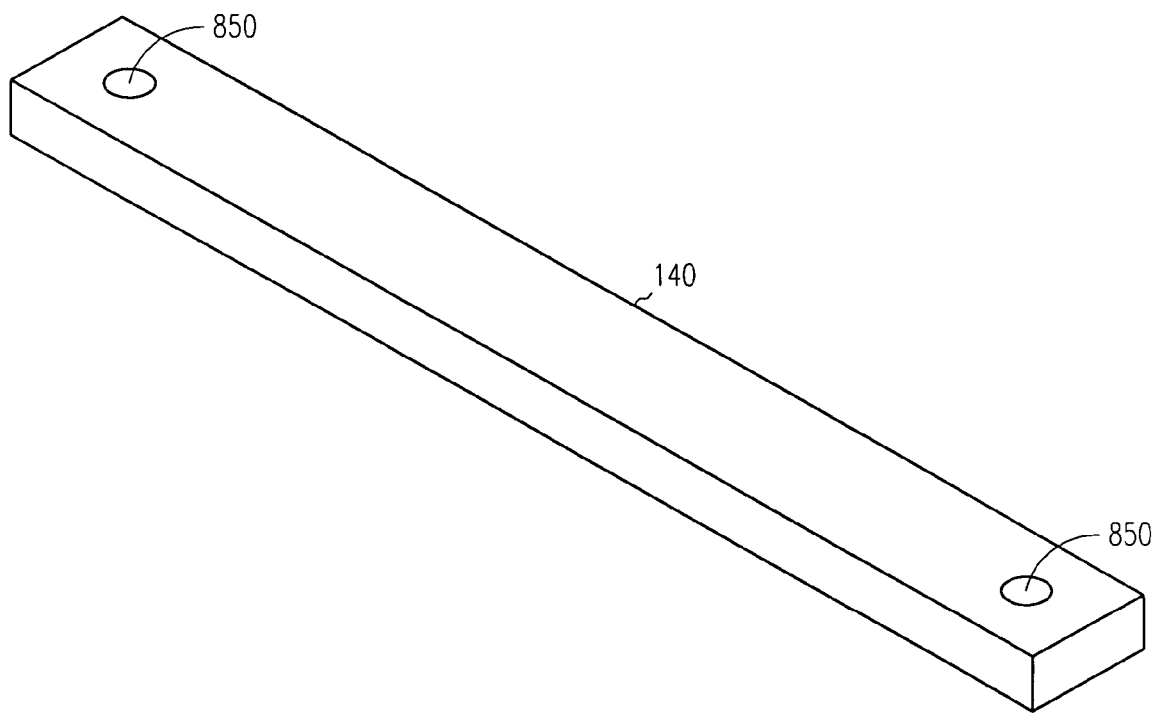
FIG. 8B is a perspective bottom view of a miter track used with the wood holding device of FIG. 8A in one embodiment of the present invention.

FIG. 8B shows an opening 850 in the miter track 140 on each end which extends through the entire thickness of the miter track 140. In use, each opening 850 is aligned with a slot 130 near each end of the frame 102 as discussed herein. The miter track 140 is then secured to the device 100 through this opening 850 with the securing means 142 and is placed in the miter slot 310 of the table 307 as described above. (Alternatively, the miter track 140 can first be placed in the miter slot 310 and the device 100 then secured to the miter track 140). Once the miter track 140 is secured to the device 100, the device is able to move through the blade, as shown in FIG. 8A, in a straight manner. This allows straight cuts to be made in the workpiece, independent of the skill of the user, as the workpiece cannot wander in and out of alignment.

Figure 9A:
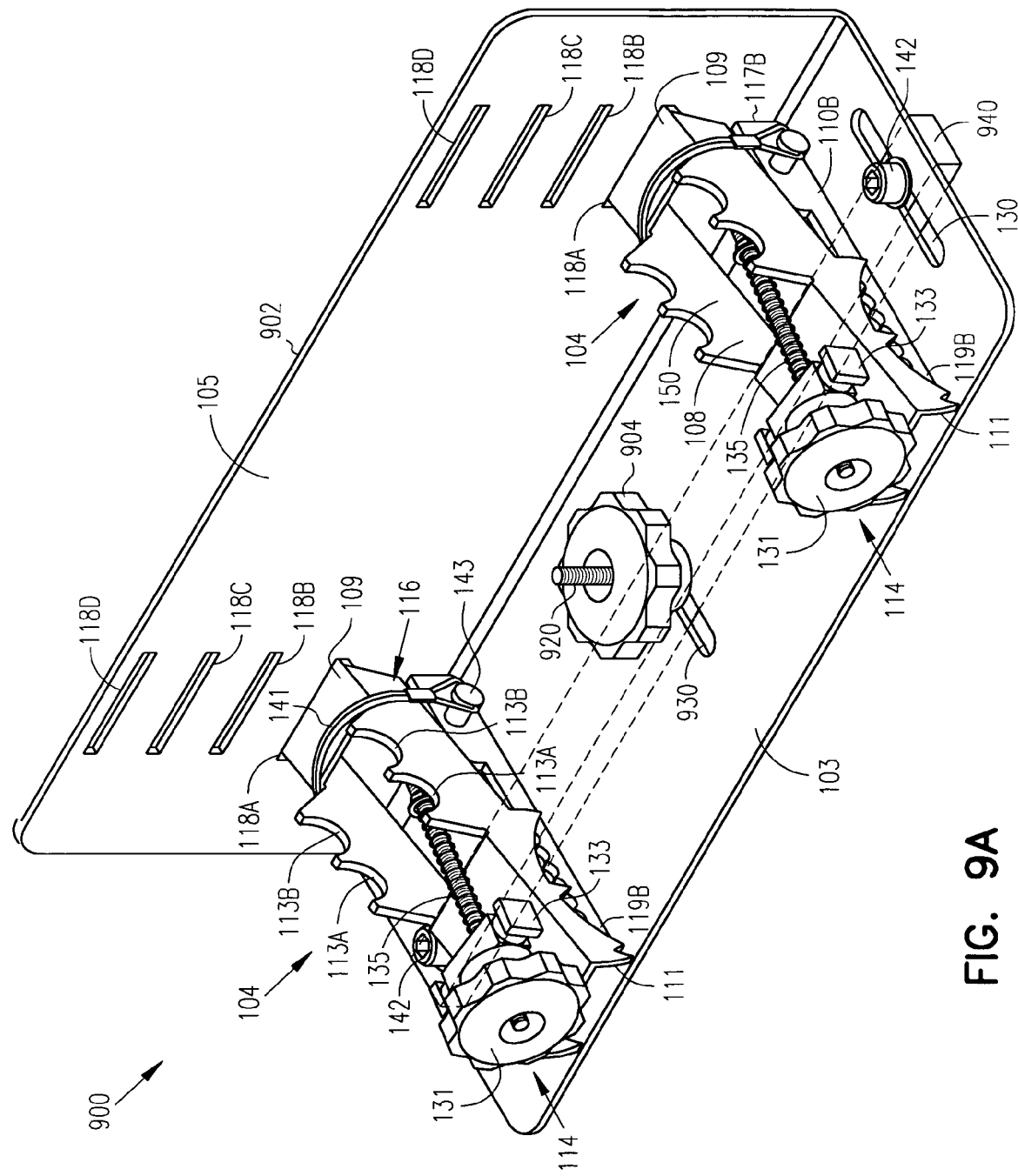
FIG. 9A is a front perspective view of an alternative wood holding device with two sets of attached jaws which is also capable of being used as a fence in one embodiment of the present invention.
Figure 10:
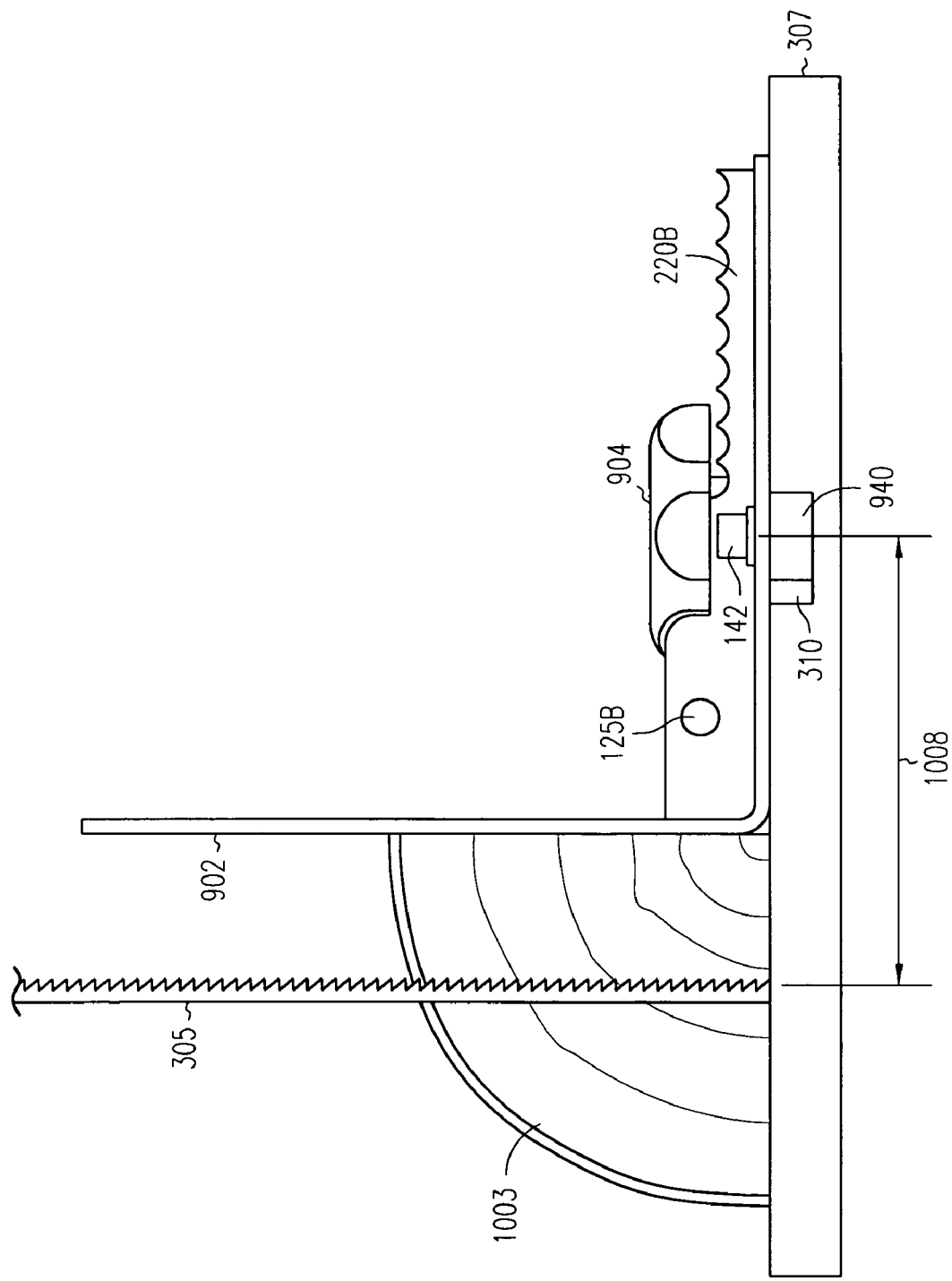
FIG. 10 is an end view of the alternative wood holding device shown in FIG. 9 in use as a fence, with a band saw in one embodiment of the present invention.

FIG. 9A provides an alternative wood holding device 900 which is also capable of being used as a fence in one embodiment of the present invention. When being used as a fence, the position of the wood holding device 900 is reversed 180 degrees in relation to the band saw, as shown in FIG. 10. In this embodiment, the horizontal portion 103 of the frame 902 further includes a central slot 930 and a securing device, such as an adjusting knob 904 in combination with a bolt 920, which is used to secure the frame 902 to the miter track 940 and to the table (not shown). The central slot 930 can be any suitable size. In one embodiment the central slot 930 is about the same size and shape as the outer slot(s) 130 shown in FIG. 1, although the invention is not so limited. The securing device can also have any suitable configuration as long as it can perform the intended function and is not limited to the components shown in the exemplary embodiment of FIG. 9A. In an alternative embodiment, the device 100 shown in FIG. 1 (without a central hole) can also be used as a fence by clamping it to a table in any manner to allow workpieces to be placed against it and cut with the blade. In such an embodiment, the miter track 140 shown in FIG. 8 can still be used to align the device 100 (if a miter slot is present on the table).

Figure 9B:
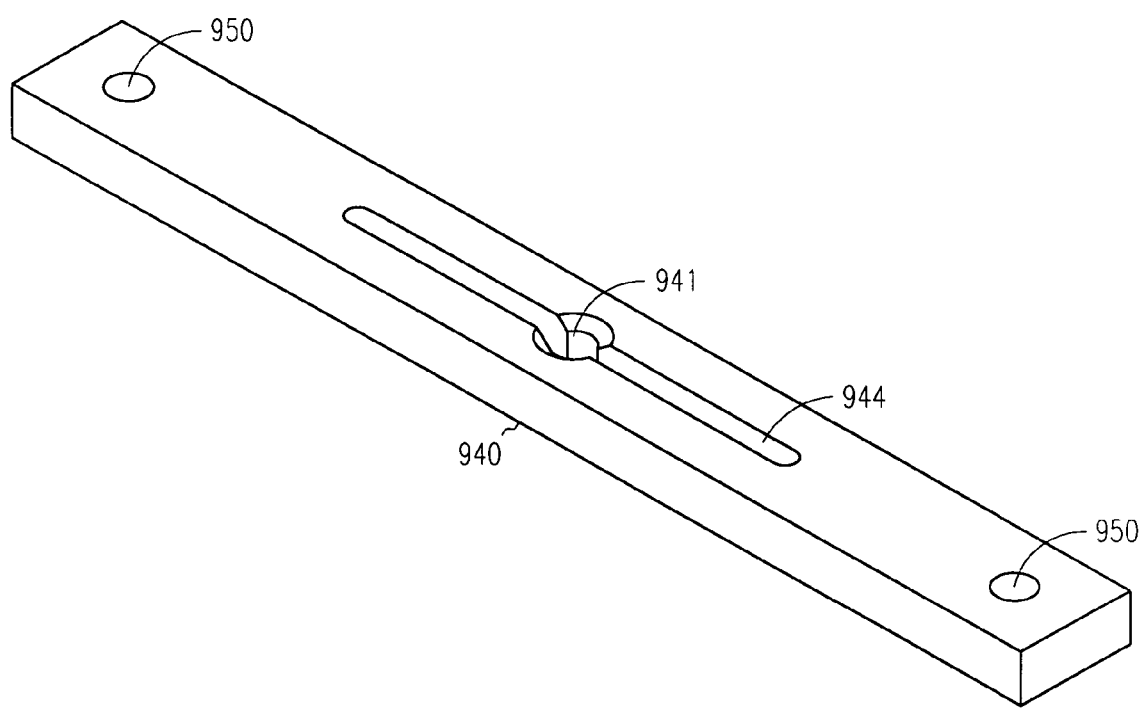
FIG. 9B is a perspective bottom view of an alternative miter track used primarily with the alternative wood holding device of FIG. 9A in one embodiment of the present invention.

In the embodiment shown in FIG. 9B, in addition to the two outer holes 950 which extend through the entire thickness of the miter track 940, this miter track 940 further has a central hole 941 located substantially in the center of the miter track 940, in combination with an optional slot 944 for locking the miter track 940 to the frame 102 and to the table 307 (See FIG. 10). In this embodiment, the central hole 941 is tapered, thus allowing a wedge-shaped bolt and nut to be used. In this way, when the wedge is pulled up into the tapered central hole 941, the miter track 940 expands, thus tightening within the miter slot 310 of the table 307. In use, each opening 950 is aligned with a slot 130 on each end of the frame 902 and the central opening 942 is aligned with the central slot 930 in the frame 902 (See FIG. 10). The miter track 940 therefore has a third contact point with the frame 902, providing added stability. Additionally, the miter track 940 can now be securely fixed to the miter slot 310 in the table 307 (FIG. 10). It should be noted that any suitable configuration of openings, slots and securing devices can be used to secure the device 900 to the table 307, with or without the use of a miter track and a miter slot. In one embodiment, the device 900 is alternatively or additionally secured to the table 307 near each end.

FIG. 10 is an end view of the alternative wood holding device shown in FIG. 9 in use as a fence (i.e., turned 180 degrees from the device shown in FIG. 8A) with a band saw in one embodiment of the present invention. This is essentially the same device as described herein, but with the additional center slot. As can be seen, the same device 900 can now be used to not only hold or clamp logs for cutting as described herein, such as the partially cut log 1003 shown in FIG. 10, but additionally provides a fence against which partially cut logs having a substantially 90 degree corner can be further cut into boards of a desired width and length. The ability of the alternative log holding unit 900 to further serve as a fence has many advantages including ease of set up and requiring only one tool to perform two separate and distinct functions. Distance 1008 can be varied as desired due to the presence of the slots 130, as discussed above.

In one embodiment, the invention is a method comprising providing a wood holding device having a substantially horizontal portion connected to a substantially vertical portion, the substantially vertical portion having a front side and a back side; securing a workpiece between the substantially horizontal portion and a jaw located on the front side of the substantially vertical portion; placing the wood holding device on a table with the front side of the substantially vertical portion facing a blade securable to the table; and moving the device forward through the blade wherein the workpiece is cut. In one embodiment, the method further comprises securing a miter track to the wood holding device; and prior to moving the device forward through the blade, placing the miter track in a miter slot located on the table. In one embodiment the substantially horizontal portion has one or more jaw elements. In one embodiment, the jaw located on the front side of the substantially vertical portion is an upper jaw adjustable in height and aligned with the one or more lower jaw elements on the substantially horizontal portion to provide a single set of jaws. In one embodiment, there are two sets of jaws. In one embodiment, the method further comprises moving the upper jaw in both sets of jaws to a different height to accommodate a different workpiece. In one embodiment, the workpiece is a log or a stack of wood. In one embodiment, the log is a whole log and the method further comprises rotating the log a one-quarter turn after making a first cut; and making a second cut in the log. In one embodiment, the method further comprises placing the wood holding device on the table with the back side of the substantially vertical portion facing the blade; and cutting the workpiece with the blade as the workpiece is moved along the table.

The invention further comprises a method of using a band saw comprising providing a band saw connected to a band saw table; aligning a wood holding device with the band saw; clamping a workpiece to the wood holding device; and moving the wood holding device in a forward direction wherein the workpiece is cut with the band saw. In one embodiment, the band saw table has a miter slot, and the method further comprises placing a miter track in the miter slot; and securing a wood holding device to the miter track. In one embodiment the workpiece is a log. In another embodiment the workpiece is a stack of wood.

The present invention provides devices that are essentially unique miniature sawmills. For the first time, a conventional saw, such as a stationary and upright band saw (or table saw) can now be converted into a handy and portable sawmill using one of the devices described herein as an accessory, without the need to make any alterations to the saw or saw table. Users can now, for the first time, hold very short (less than about one (1) ft) and small diameter (down to about one (1) inch) logs in the device of the present invention and slice them into lumber without causing splitting of the log. Once the log or other workpiece is properly clamped with the unique clamping system of the present invention, the attached sled or frame can be guided through a blade, straight and safely, using, in a preferred embodiment, only the miter slot as a guide. Virtually any size and shape of workpiece can be gripped and cut to any desired dimension. The unique design of the device 100 prevents bending of the blade while the unique design of the clamping system minimizes damage to the workpiece itself. In the embodiment in which the device can also be used as a fence, the device has the added convenience of reducing the number of required tools, thus requiring less storage space.

Although specific embodiments have been illustrated and described herein, it will be appreciated by those of ordinary skill in the art that any arrangement that is calculated to achieve the same purpose may be substituted for the specific embodiment shown. For example, although the workpiece is described herein as primarily being a wood workpiece, it is possible that the device can be used with other types of workpieces, including metal components such as pipes, ceramics, plastics, and the like. Additionally, although the invention has been described for use primarily with a conventional band saw (running vertically), it is understood that it can further be used with other devices, such as a router table or table saw table, such as for corner cut-out applications using a router bit as is known in the art. This application is intended to cover any adaptations or variations of the present subject matter. Therefore, it is manifestly intended that embodiments of this invention be limited only by the claims and the equivalents thereof.

What is claimed is:

1. A device comprising:
   at least one frame having a substantially horizontal planar surface contiguous with a substantially vertical planar surface;
   at least one clamping device securable to the at least one frame, the at least one clamping device comprising an upper jaw securable on a first end to the substantially vertical planar surface and a lower jaw securable to the substantially horizontal planar surface, further wherein teeth on the upper jaw and lower jaw are not aligned, the lower jaw having at least two rows of teeth;
   a locking mechanism for locking the first end of the upper jaw into place during use, the locking mechanism comprising a locking block and a threaded shaft, wherein the threaded shaft is insertable into an opening in the upper jaw and securable on one end to the frame, and the locking block is selectively positionable into one of a plurality of grooves located near the first end of the upper jaw; and
   means for aligning the at least one clamping device in a substantially straight line adjacent to a saw.

2. The device of claim 1 wherein the saw has a blade and is connected to a table, the table having a miter slot, further wherein the means for aligning comprises a miter track securable to the substantially horizontal planar surface of the frame, the miter track adapted to fit within the miter slot.

3. The device of claim 2 wherein the miter track is securable to the at least one frame in at least two locations.

4. The device of claim 1 wherein the spring holds the locking block in place during use.

5. The device of claim 1 wherein the upper jaw position is adjustable to accommodate differently-sized workpieces.

6. The device of claim 5 further comprising at least one height extender connectable to the at least one frame.

7. The device of claim 2 wherein the at least one frame has a front clamping side and a back fence side and the device is placeable on the table with the back fence side facing the blade for use as a fence.

8. The device of claim 2 wherein the miter track is securable to the at least one frame in at least two locations and to the table in an additional location between the at least two locations.

9. The device of claim 1 wherein the saw is a vertical band saw.

10. The device of claim 5 wherein one of the differently-sized workpieces is a log or a stack of boards.

11. The device of claim 1 comprising at least two frames, each having at least one clamping device securable thereto, the at least two frames joined together with a height extender.

12. The device of claim 5 wherein a workpiece securable between the upper jaw and the lower jaw is a metal, ceramic or plastic workpiece.

13. The device of claim 1 wherein the upper jaw teeth are positionable to promote gripping of the workpiece at a substantially 90 degree angle to the workpiece.

14. The device of claim 1 wherein the lower jaw teeth have a U-shape.

15. The device of claim 14 wherein the lower jaw teeth have tips about 0.25 to 0.75 inches apart, each tooth with a height of about 0.125 to 0.75 inches.

16. The device of claim 1 wherein the grooves comprise two sets of groove pairs.

17. The device of claim 1 comprising at least two clamping devices.

18. The device of claim 1 further comprising a knob adjacent to the locking block and engagable with the threaded shaft, wherein a spring surrounding the threaded shaft forces the locking block upwardly when the knob is tightened, wherein the upper jaw can be raised a desired amount.

* * * * *